United States Patent
Faccia

(10) Patent No.: US 7,322,537 B2
(45) Date of Patent: Jan. 29, 2008

(54) TRUCK FOR SHREDDING AND MIXING PRODUCTS FOR ZOOTECHNICAL USE

(76) Inventor: Tiziano Faccia, Via Terrassa, 1 - 35026, Conselve (IT)

( * ) Notice: Subject to any disclaimer, the term of this patent is extended or adjusted under 35 U.S.C. 154(b) by 594 days.

(21) Appl. No.: 10/490,268

(22) PCT Filed: Sep. 25, 2002

(86) PCT No.: PCT/IB02/03984

§ 371 (c)(1),
(2), (4) Date: Mar. 22, 2004

(87) PCT Pub. No.: WO03/030632

PCT Pub. Date: Apr. 17, 2003

(65) Prior Publication Data

US 2004/0245359 A1 Dec. 9, 2004

(30) Foreign Application Priority Data

Sep. 28, 2001 (IT) .......................... PD2001A0228

(51) Int. Cl.
*B02C 19/00* (2006.01)
(52) U.S. Cl. .............................. 241/101.761; 366/314; 366/603
(58) Field of Classification Search ......... 241/101.761, 241/101.8, 260.1; 30/297, 299, 314, 232, 30/603
See application file for complete search history.

(56) References Cited

U.S. PATENT DOCUMENTS

| | | | | |
|---|---|---|---|---|
| 3,899,159 A | * | 8/1975 | Nauta ...................... | 366/169.1 |
| 4,432,499 A | | 2/1984 | Henkensiefken | |
| 5,240,321 A | * | 8/1993 | Miller ......................... | 366/45 |
| 5,553,938 A | * | 9/1996 | Faccia ........................ | 366/302 |
| 5,803,375 A | * | 9/1998 | Hartwig ....................... | 241/28 |
| 6,409,377 B1 | * | 6/2002 | Van Der Plas .............. | 366/297 |

FOREIGN PATENT DOCUMENTS

| DE | 298 01 088 | 3/1998 |
|---|---|---|
| DE | 198 29 867 | 1/2000 |
| DE | 200 10 221 | 8/2000 |
| EP | 0 704 153 | 4/1996 |
| EP | 0 709 022 | 5/1996 |
| EP | 0 779 027 | 6/1997 |

\* cited by examiner

*Primary Examiner*—Shelley M. Self
(74) *Attorney, Agent, or Firm*—Modiano & Associati; Albert Josif; Daniel J. O'Byrne

(57) ABSTRACT

Truck for shredding and mixing products for zootechnical use having, on a chassis with wheels that is self-propelled or towed, a container that is substantially shaped like an inverted frustum, is open in an upper region and contains shredding and mixing elements which have at least two adjacent rotating screw feeders with substantially vertical axes arranged at staggered levels on corresponding staggered bottom regions of the container, each screw feeder having an external profile that lies on a substantially conical imaginary surface and at which shredding cutters are mounted, contrast cutters substantially shaped like circular sectors being hinged to the internal wall of the container by their respective vertices in a vertical arrangement in substantially radial positions and being insertable and removable trough appropriately provided slots.

17 Claims, 4 Drawing Sheets

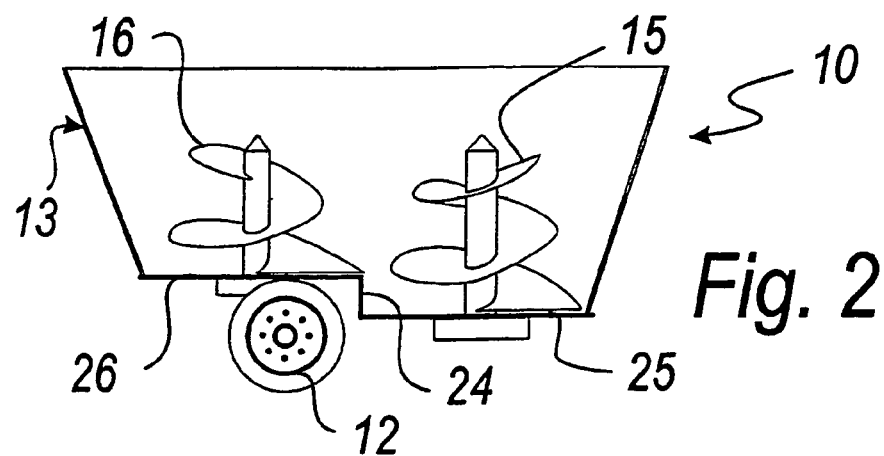
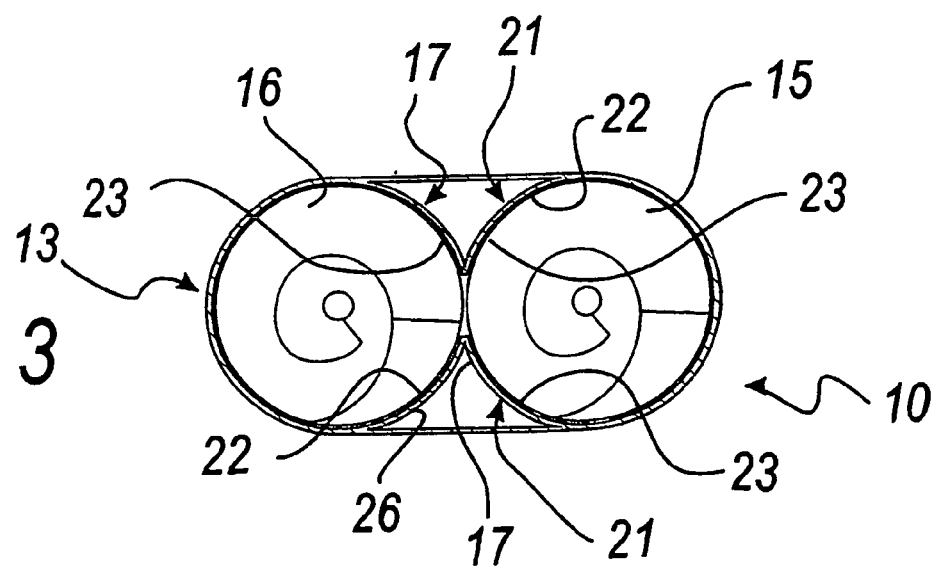

TRUCK FOR SHREDDING AND MIXING PRODUCTS FOR ZOOTECHNICAL USE

TECHNICAL FIELD

The present invention relates to a truck for shredding and mixing products for zootechnical use.

BACKGROUND ART

In the zootechnical sector, it is known to prepare fodder, particularly for cattle, by using shredding and mixing trucks provided with a vertical screw feeder and substantially constituted by an inverted frustum-shaped container arranged on a wheeled chassis inside which a rotating screw feeder is arranged vertically, the profile of its helix lying on a substantially conical imaginary surface.

Cutters are fixed peripherally to the screw feeder and are suitable to shred the product being mixed, which is appropriately loaded from above and is constituted largely by fibrous material such as hay and straw with the addition of protein supplements, ensilaged products, flours, et cetera.

To contrast the rotary motion of the product being processed entrained by the rotating screw feeder, in the lower part of the container there are contrast cutters, which are arranged vertically in substantially radial positions and can be inserted and removed through slots provided in the wall of the container.

The above described trucks, while being used successfully, have drawbacks related most of all to the level and to the time required in shredding and mixing operations.

Moreover, recirculation and mixing on the substantially vertical plane is still not optimum.

DISCLOSURE OF THE INVENTION

The aim of the present invention is to provide a truck for shredding and mixing products for zootechnical use in which the drawbacks noted above in known types of truck are eliminated, particularly improving the times and levels of mixing and shredding.

Within this aim, a consequent primary object is to provide a truck in which the mechanical work of its components is optimized with reference to the stresses to which they are subjected, to the consequent wear, and to the quality of the fodder obtained.

Another important object is to provide a truck that has reduced bulk problems related to the screw feeders in relation to the achieved productivity.

Another object of the present invention is to provide a truck that can be manufactured with known technologies and systems.

This aim and these and other objects that will become better apparent hereinafter are achieved by a truck for shredding and mixing products for zootechnical use, of the type that comprises, on a wheeled chassis that is self-propelled or towed, a container that is substantially shaped like an inverted frustum, is open in an upper region and contains shredding and mixing means which comprise at least two adjacent rotating screw feeders with substantially vertical axes, each one of said screw feeders having an external profile that lies on a substantially conical imaginary surface and at which shredding cutters are mounted, contrast cutters substantially shaped like circular sectors being hinged to the internal wall of said container by means of their respective vertices in a vertical arrangement in substantially radial positions and being insertable and removable through appropriately provided slots, said truck being characterized in that said screw feeders are arranged at staggered levels on corresponding staggered bottom regions of said container.

BRIEF DESCRIPTION OF THE DRAWINGS

Further characteristics and advantages of the invention will become better apparent from the detailed description of an embodiment thereof and of corresponding variations, illustrated only by way of non-limitative example in the accompanying drawings, wherein:

FIG. 2 is a schematic longitudinal sectional view of the truck of FIG. 1;

FIG. 3 is a schematic top view of the container of the truck of FIG. 1;

WAYS OF CARRYING OUT THE INVENTION

Figure 1:
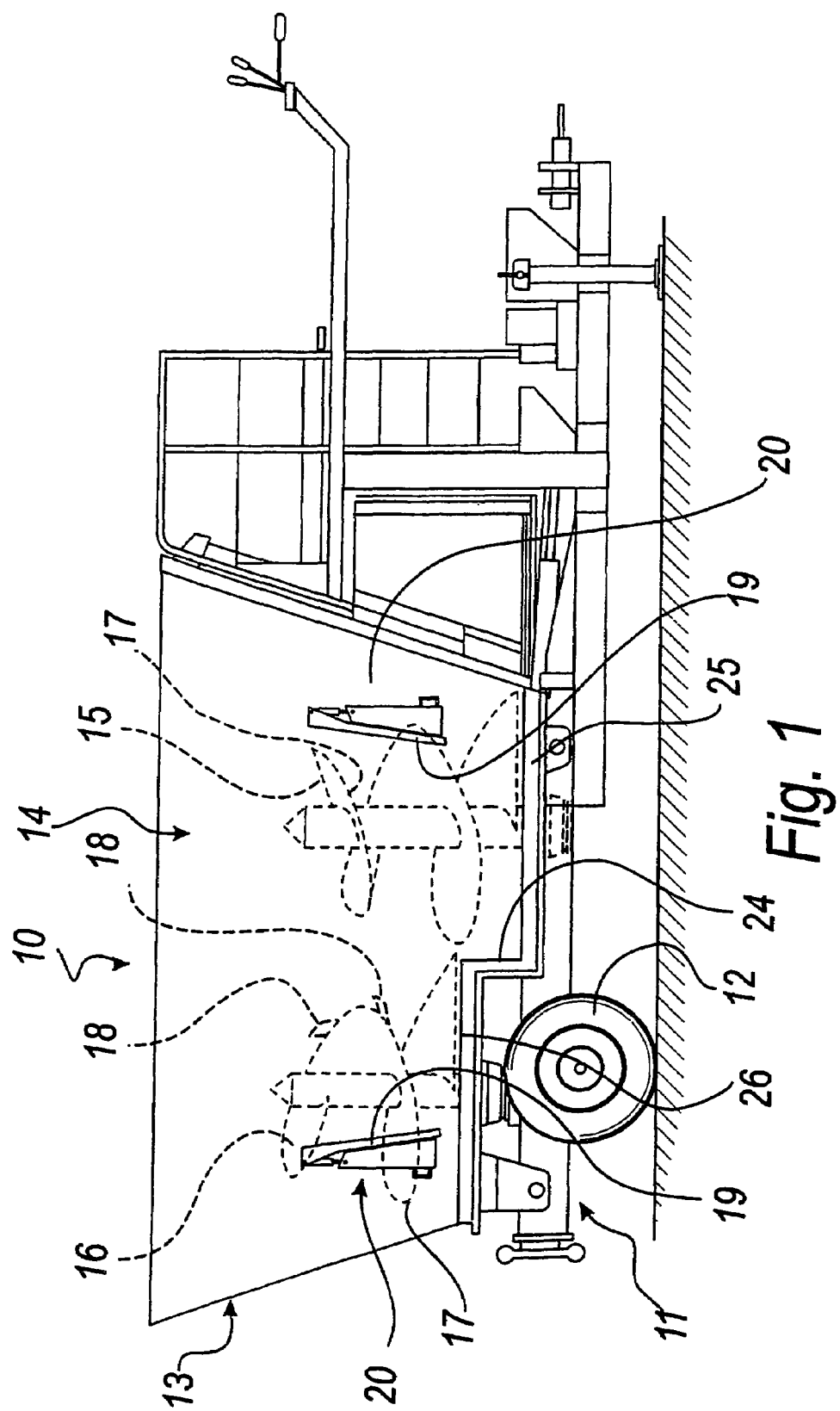
FIG. 1 is a sectional orthographic projection view of a truck according to the invention.

With reference to FIGS. 1 to 3, a truck for shredding and mixing products for zootechnical use according to the invention is generally designated by the reference numeral 10 in a first embodiment.

The truck 10 comprises, on a chassis 11 with wheels 12, which in this case is towed, a container 13 that is shaped approximately like an inverted frustum, is open in an upper region, and contains shredding and mixing means, generally designated by the reference numeral 14.

The shredding and mixing means 14 comprise two rotating screw feeders, designated by the reference numerals 15 and 16 respectively, which are adjacent and have mutually parallel vertical axes; each screw feeder has an external profile 17 that lies on an imaginary substantially conical surface at which shredding cutters 18 are fitted.

The maximum diameter of the screw feeders 15 and 16 in this case is such that the side walls of the container 13 have parallel profiles in plan view.

The internal wall of the container 13 is shaped so as to help, together with the screw feeders 15 and 16, to form the mixing path.

Contrast cutters 20, shaped substantially like a circular sector, are hinged to the wall of the container 13 by means of their respective vertices in a vertical arrangement on substantially radial positions and can be inserted and removed through appropriately provided slots 19.

More precisely, in this case the container 13 is shaped, at the internal wall, so as to form two mutually opposite raised portions 21, which are complementary to corresponding portions 22 of the profiles 17 of the screw feeders 15 and 16.

The raised portions 21 have an approximately triangular cross-section, with the two catheti 23 curved so as to follow the shape of part of the profiles 17 of the screw feeders 15 and 16.

The container 13 further has a bottom that is shaped so as to form two surfaces at different levels separated by a step 24; a corresponding one of said two screw feeders 15 and 16 is rotatably associated on each one of said surfaces with a substantially perpendicular rotation axis; in particular, in the screw feeder 15 arranged at the lower surface 25 the lower portion of the profile 17 is arranged as an ideal extension of the lower portion of the profile 17 of the screw feeder 16 arranged at the upper surface 26, the two screw feeders 15 and 16 thus forming a movable lower recirculation surface.

In this case, the lower surface 25 and the upper surface 26 of the bottom are substantially parallel to the travel plane of the truck 10; however, in possible constructive variations for example the lower surface 25 might be substantially inclined, descending toward the upper surface 26, with respect to the travel plane of the truck 10 or, as an alternative, the upper surface 26 might be substantially inclined, descending toward the lower surface 25, again with respect to the travel plane of the truck 10.

The lower surface 25 and the upper surface 26 might both be substantially inclined so as to converge downward with respect to the travel plane of the truck 10.

The two screw feeders 15 and 16 have, in a projection view, lower portions of the profile 17 that are substantially tangent to each other.

Figure 4:
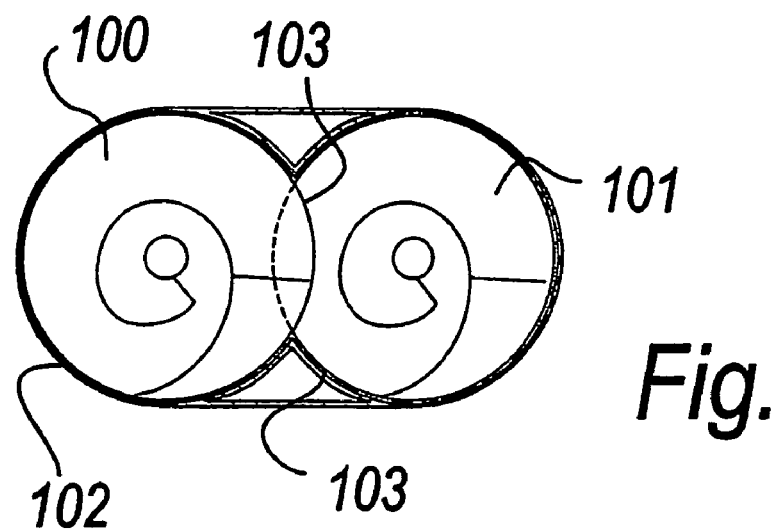
FIG. 4 is a schematic top view of the container of the truck in a second embodiment.

A second embodiment of the truck 10, to which reference is made for further constructive details, is described with particular reference to FIG. 4; in said embodiment, the screw feeders, designated here by the reference numerals 100 and 101 respectively, inside a container 102, have lower portion profiles 103 that partially intersect in a projection view.

Figure 5:
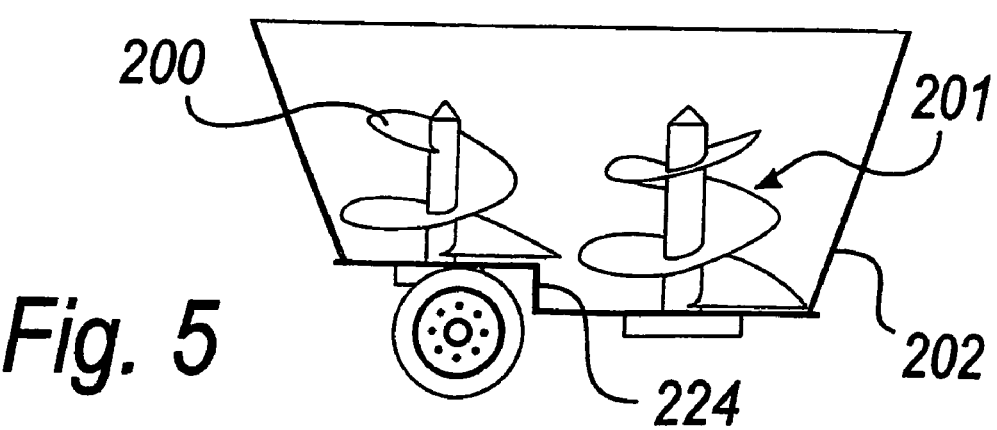
FIG. 5 is a schematic longitudinal sectional view of the truck in a third embodiment.
Figure 6:
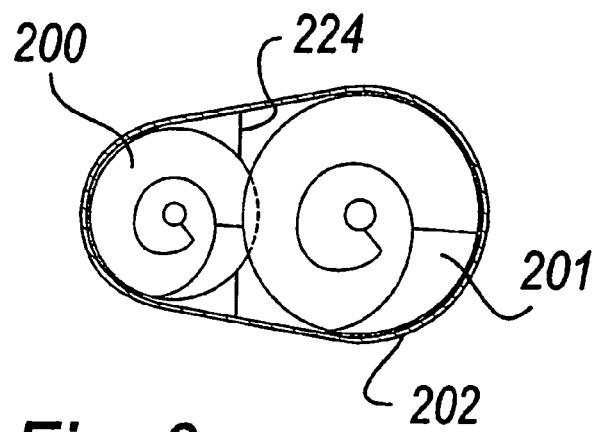
FIG. 6 is a schematic top view of the container of the truck of the embodiment of FIG. 5.

FIGS. 5 and 6 illustrate a third embodiment of the truck 10, to which reference is made for further constructive details; in this embodiment, the screw feeders, designated here by the reference numerals 200 and 201 respectively, inside a container 202, have mutually different maximum overall diameters (and accordingly the side walls of the container 202 have profiles, in plan view, that are no longer parallel but converge toward each other).

Furthermore, the container 202 has a step 224 that is shifted with respect to the centerline.

Figure 7:
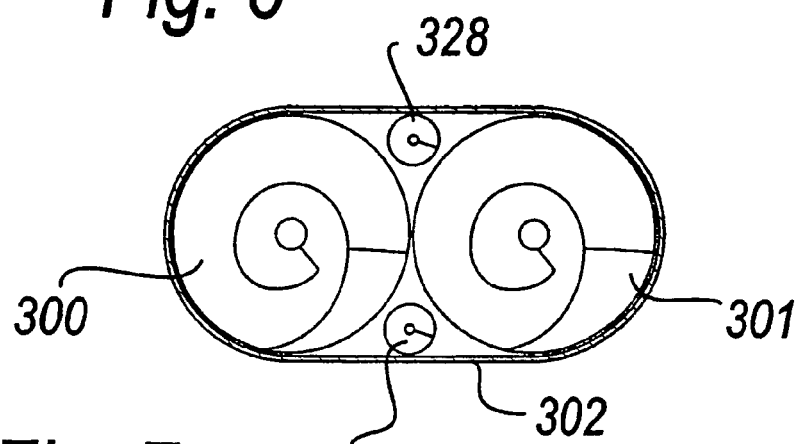
FIG. 7 is a schematic top view of the container of the truck in a fourth embodiment.

FIG. 7 illustrates a fourth embodiment of the truck 10, to which reference is made for further constructive details, in which two auxiliary screw feeders 327 and 328 cooperate with the screw feeders, designated here by the reference numerals 300 and 301 respectively, inside a container 302; said auxiliary screw feeders are arranged at the raised portions 21 of the first embodiment (which they replace) so as to avoid stagnation regions.

Each one of the screw feeders 327 and 328 can be vertical or horizontal (not shown in the figures).

Figure 8:
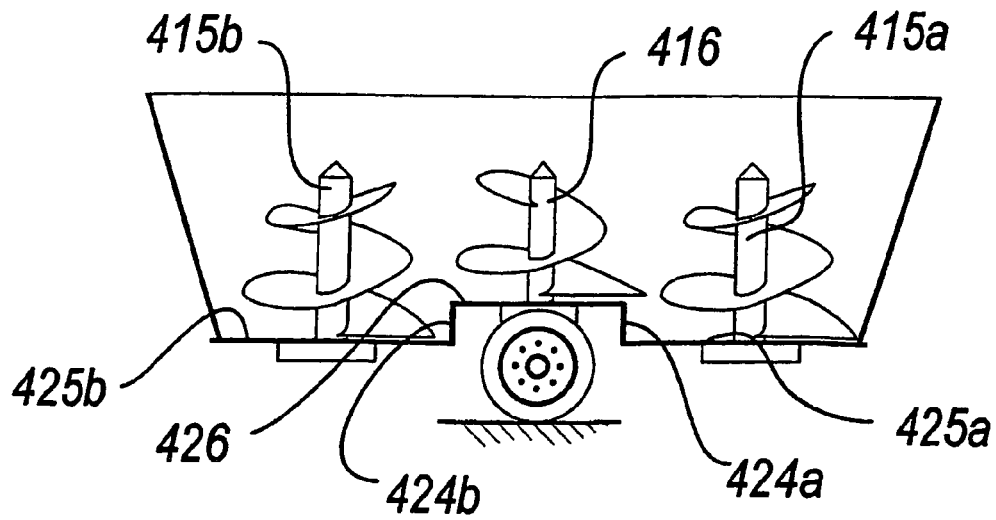
FIG. 8 is a schematic longitudinal sectional view of the truck in a fourth embodiment.

Moreover, in relation to both the main embodiment and the illustrated variations, there is a fourth embodiment, shown in FIG. 8, in which the truck has three screw feeders that are aligned along the direction of movement of said truck.

In particular, the container is shaped at the bottom so as to form three surfaces in series to each other, the central surface 426 being arranged at a higher level than the other two lateral surfaces 425a and 425b, measured with reference to the travel plane of the truck.

The lateral surfaces 425a and 425b lie substantially at a same level and each one is separated from the central surface by means of a step, which is respectively designated by the reference numeral 424a and 424b.

One of said three screw feeders, designated by the reference numerals 416, 415a and 415b respectively, is rotatably associated on each one of the surfaces 426, 425a and 425b with a substantially perpendicular rotation axis.

In practice it has been found that the intended aim and objects of the present invention have been achieved.

In particular, it is noted that in the truck according to the invention the drawbacks noted in known types of truck, with particular reference to the times and levels of mixing and shredding, are completely eliminated.

Moreover, the truck according to the invention allows high optimization of the mechanical work of the components that constitute it, especially with reference to the stresses to which it is subjected and to the consequent wear, and the quality of the resulting fodder.

Moreover, it is noted that the discharge of the mixed product is facilitated by way of the internal configuration of the container and of the arrangement of the screw feeders.

Furthermore, the presence of the step on the bottom allows to use wheels that have a larger diameter and therefore allows to avoid any need for a twin axle.

The truck according to the invention further has, with respect to the obtained productivity, optimum dimensions as regards the screw feeders.

In practice, the materials employed, so long as they are compatible with the contingent use, as well as the dimensions, may be any according to requirements.

The disclosures in Italian Patent Application No. PD2001A000228, from which this application claims priority, are incorporated herein by reference.

What is claimed is:

1. A truck for shredding and mixing products for zootechnical use, of the type comprising, on a wheeled chassis that is self-propelled or towed, a container that is substantially shaped like an inverted frustum, is open in an upper region and contains means for shredding and mixing which comprise at least two adjacent rotating screw feeders with substantially vertical axes, each one of said screw feeders having an external profile that lies on a substantially conical imaginary surface and at which shredding cutters are mounted, contrast cutters substantially shaped like circular sectors being hinged to an inner wall of said container respective vertices thereof in a vertical arrangement in substantially radial positions and being insertable and removable through slots, wherein said screw feeders are arranged at surfaces that lie at different levels with respect to the travel plane of said truck on corresponding staggered bottom regions of said container.

2. The truck of claim 1, wherein said container is shaped, at the internal wall, so as to form one or more raised portions that are complementary to corresponding portions of the profiles of said at least two screw feeders.

3. The truck of claim 2, wherein said one or more raised portions have an approximately triangular cross-section having two catheti curved so as to follow the shape of part of the profiles of said at least two screw feeders.

4. The truck of claim 1, wherein said container is shaped, at the bottom, so as to form two surfaces that lie at different levels with respect to the travel plane of said truck and are separated by a step, one of said at least two screw feeders being rotatably associated on each one of said surfaces with a substantially perpendicular rotation axis, the screw feeder arranged at the lower surface having the lower portion of the profile arranged as an ideal extension of the lower portion of the profile of the screw feeder arranged at the upper surface, said at least two screw feeders thus forming a movable lower recirculation surface.

5. The truck of claim 4, wherein said lower and upper surfaces of the bottom are substantially parallel to the travel plane of said truck.

6. The truck of claim 4, wherein said lower surface is substantially inclined downward toward the upper surface with respect to the travel plane of said truck.

7. The truck of claim 4, wherein said upper surface is substantially inclined downward toward the lower surface with respect to the travel plane of said truck.

8. The truck of claim 4, wherein said lower surface and said upper surface are substantially inclined so as to converge downward toward each other with respect to the travel plane of said truck.

9. The truck of claim 1, wherein said at least two screw feeders have, in projection view, substantially mutually tangent lower profile portions.

10. The truck of claim 1, wherein said at least two screw feeders have lower profile portions that partially intersect in projection view.

11. The truck of claim 1, wherein said at least two screw feeders have mutually different maximum diameters.

12. The tuck of claim 1, wherein profiles of side walls of said container converge in a plan view.

13. The truck of claim 1, wherein two auxiliary screw feeders cooperate with said at least two screw feeders and are arranged so as to avoid regions of stagnation at central regions of side walls.

14. The truck of claim 13, wherein at least one of said auxiliary screw feeders has a vertical axis.

15. The truck of claim 13, wherein at least one of said auxiliary screw feeders has a horizontal axis.

16. The truck of claim 4, wherein said step is displaced with respect to the centerline of said container.

17. The truck of claim 1, wherein said container is shaped, at the bottom, so as to form three surfaces arranged in series to each other, each one of said three surfaces being separated from the adjacent surface by a step, a central surface of said three surfaces being arranged at a higher level than the other two surfaces, measured with reference to a travel plane of said truck, one of said screw feeders being rotatably associated on each one of said surfaces with a substantially perpendicular rotation axis.

* * * * *